United States Patent
Fisher et al.

(10) Patent No.: US 9,264,474 B2
(45) Date of Patent: Feb. 16, 2016

(54) SYSTEM AND METHOD OF PORTRAYING THE SHIFTING LEVEL OF INTEREST IN AN OBJECT OR LOCATION

(71) Applicant: KBA2, Inc., Tiburon, CA (US)

(72) Inventors: Jon Fisher, Tiburon, CA (US); Jeff Broderick, Ross, CA (US); Douglas Van Blaricom, San Pablo, CA (US); Alex Malinovsky, Lafayette, CA (US); Anthony S. Wu, Richmond, CA (US)

(73) Assignee: KBA2 Inc., San Francisco, CA (US)

( * ) Notice: Subject to any disclaimer, the term of this patent is extended or adjusted under 35 U.S.C. 154(b) by 340 days.

(21) Appl. No.: 13/889,290

(22) Filed: May 7, 2013

(65) Prior Publication Data

US 2014/0337477 A1    Nov. 13, 2014

(51) Int. Cl.
| | |
|---|---|
| *G06K 9/62* | (2006.01) |
| *G06K 9/00* | (2006.01) |
| *G06K 9/46* | (2006.01) |
| *G06K 9/74* | (2006.01) |
| *H04L 29/06* | (2006.01) |
| *G06T 7/00* | (2006.01) |
| *H04W 4/02* | (2009.01) |
| *H04W 4/08* | (2009.01) |

(52) U.S. Cl.
CPC ............ *H04L 65/601* (2013.01); *G06K 9/6217* (2013.01); *G06K 9/6218* (2013.01); *G06T 7/004* (2013.01); *H04W 4/026* (2013.01); *H04W 4/08* (2013.01)

(58) Field of Classification Search
None
See application file for complete search history.

(56) References Cited

U.S. PATENT DOCUMENTS

| | | | |
|---|---|---|---|
| 5,694,514 A | 12/1997 | Evans et al. | 386/46 |
| 5,729,471 A | 3/1998 | Jain et al. | 364/514 A |
| 5,745,126 A | 4/1998 | Jain et al. | 345/952 |
| 5,850,352 A | 12/1998 | Moezzi et al. | 364/514 A |
| 5,917,958 A | 6/1999 | Nunally et al. | 382/276 |
| 6,002,995 A | 12/1999 | Suzuki et al. | 702/188 |
| 6,591,068 B1 | 7/2003 | Dietz | 396/429 |
| 6,597,393 B2 | 7/2003 | Kato et al. | 348/211.99 |
| 6,680,746 B2 | 1/2004 | Kawai et al. | 348/211.9 |
| 6,809,760 B1 | 10/2004 | Takagi et al. | 348/211.9 |

(Continued)

FOREIGN PATENT DOCUMENTS

| | | |
|---|---|---|
| GB | 2 397 908 A | 8/2004 |
| WO | 01/61588 A1 | 8/2001 |

OTHER PUBLICATIONS

Cheng et al., "GPS, Compass, or Camera?: Investigating Effective Mobile Sensors for Automatic Search-Based Image Annotation," Proceeding of the International Conference on Multimedia, pp. 815-818, Oct. 25-29, 2010.

*Primary Examiner* — Matthew Bella
*Assistant Examiner* — Jose M Torres
(74) *Attorney, Agent, or Firm* — Winston & Strawn LLP

(57) ABSTRACT

The principles of the invention relate to a system and method, that may include various different software and hardware components, that can provide feedback graphically indicating how many people are focused on an object or location at the same time on observers' image capture device screen. Such information may be communicated to each observer's device to convey the aggregate level of interest in the object, where the system performs operations involving tracking of the focus of the image capture devices, such as cell phones, on a location, following changes in a cluster size, and using the information to alter the displayed images according to the level of interest.

15 Claims, 6 Drawing Sheets

(56) References Cited

U.S. PATENT DOCUMENTS

| | | | |
|---|---|---|---|
| 6,891,566 B2 | 5/2005 | Marchese | 348/211.3 |
| 7,027,083 B2 | 4/2006 | Kanade et al. | 348/159 |
| 7,193,645 B1 | 3/2007 | Aagaard et al. | 348/211.3 |
| 7,196,722 B2 | 3/2007 | White et al. | 348/211.99 |
| 7,242,423 B2 | 7/2007 | Lin | 348/169 |
| 7,447,380 B2 | 11/2008 | Williams et al. | 382/284 |
| 7,448,063 B2 | 11/2008 | Freeman et al. | 725/136 |
| 7,460,150 B1 | 12/2008 | Coughlan et al. | 348/169 |
| 7,472,134 B2 | 12/2008 | Kaku | 707/104.1 |
| 7,495,687 B2 | 2/2009 | DuMas et al. | 348/143 |
| 7,576,770 B2 | 8/2009 | Metzger et al. | 348/143 |
| 7,631,261 B2 | 12/2009 | Williams et al. | 715/720 |
| 7,672,937 B2 | 3/2010 | Madhavan et al. | |
| 7,746,380 B2 | 6/2010 | Maruya et al. | 348/169 |
| 7,836,093 B2 | 11/2010 | Gobeyn et al. | 707/802 |
| 7,840,130 B2 | 11/2010 | Kucharyson | 396/56 |
| 7,856,360 B2 | 12/2010 | Kramer et al. | 705/1.1 |
| 7,920,626 B2 | 4/2011 | Fernandez et al. | 375/240.16 |
| 7,956,892 B2 | 6/2011 | Frederick | 348/157 |
| 8,004,561 B2 | 8/2011 | Mottur et al. | 348/143 |
| 8,051,452 B2 | 11/2011 | Arseneau et al. | 725/74 |
| 8,115,812 B2 | 2/2012 | Yoshida et al. | 348/159 |
| 8,164,599 B1 | 4/2012 | Kadous et al. | 345/634 |
| 8,180,396 B2 | 5/2012 | Athsani et al. | 455/557 |
| 8,184,169 B2 | 5/2012 | Ortiz | 348/211.8 |
| 8,185,596 B2 | 5/2012 | Toledano et al. | 709/206 |
| 8,204,273 B2 | 6/2012 | Chambers et al. | 382/103 |
| 8,250,616 B2 | 8/2012 | Davis et al. | 725/87 |
| 8,311,279 B2 | 11/2012 | Quarfordt et al. | |
| 8,335,522 B2 | 12/2012 | Mate et al. | |
| 8,903,197 B2 * | 12/2014 | Rekimoto | H04N 1/00244 345/632 |
| 2002/0140745 A1 | 10/2002 | Ellenby et al. | 345/848 |
| 2003/0074251 A1 | 4/2003 | Kumar et al. | |
| 2003/0220835 A1 | 11/2003 | Barnes, Jr. | 705/14 |
| 2004/0075752 A1 * | 4/2004 | Valleriano et al. | 348/231.3 |
| 2004/0150715 A1 * | 8/2004 | Wilcock et al. | 348/143 |
| 2007/0146484 A1 | 6/2007 | Horton et al. | 348/159 |
| 2007/0162329 A1 | 7/2007 | Lee | |
| 2007/0162922 A1 * | 7/2007 | Park | 725/10 |
| 2007/0279494 A1 | 12/2007 | Aman et al. | 348/169 |
| 2008/0084473 A1 | 4/2008 | Romanowich | 345/135 |
| 2008/0147730 A1 | 6/2008 | Lee et al. | 707/104.1 |
| 2008/0294588 A1 | 11/2008 | Morris et al. | 706/47 |
| 2009/0012868 A1 | 1/2009 | DeAngelis | 705/14 |
| 2009/0015671 A1 | 1/2009 | Addy | 348/143 |
| 2009/0044235 A1 | 2/2009 | Davidson | 725/87 |
| 2009/0073265 A1 | 3/2009 | Greenhill et al. | 348/148 |
| 2009/0081959 A1 | 3/2009 | Gyorfi et al. | 455/70 |
| 2009/0089162 A1 | 4/2009 | Davis et al. | 705/14 |
| 2009/0102859 A1 | 4/2009 | Athsani et al. | 345/619 |
| 2009/0113505 A1 | 4/2009 | Yu | 725/114 |
| 2009/0125376 A1 | 5/2009 | Sundaresan et al. | |
| 2009/0148124 A1 | 6/2009 | Athsani et al. | 386/46 |
| 2009/0160856 A1 | 6/2009 | Hoguet | 345/420 |
| 2009/0219391 A1 | 9/2009 | McLeish et al. | 348/143 |
| 2009/0248607 A1 | 10/2009 | Eggink et al. | 706/54 |
| 2009/0319166 A1 | 12/2009 | Khosravy et al. | 701/200 |
| 2010/0030706 A1 | 2/2010 | Kannan et al. | 705/400 |
| 2010/0088159 A1 | 4/2010 | Henshaw et al. | 705/10 |
| 2010/0262497 A1 | 10/2010 | Karlsson | |
| 2010/0323716 A1 | 12/2010 | Jaffri | 455/456.1 |
| 2011/0107369 A1 | 5/2011 | O'Brien et al. | 725/38 |
| 2011/0117934 A1 | 5/2011 | Mate et al. | 455/456.3 |
| 2011/0122257 A1 | 5/2011 | Kirk | 348/187 |
| 2011/0142016 A1 | 6/2011 | Chatterjee | 370/338 |
| 2011/0187865 A1 | 8/2011 | Felt et al. | 348/159 |
| 2011/0191151 A1 | 8/2011 | Rosa | 705/14.1 |
| 2011/0199479 A1 | 8/2011 | Waldman | 348/116 |
| 2012/0011267 A1 | 1/2012 | Ma et al. | 709/231 |
| 2012/0059826 A1 | 3/2012 | Mate et al. | 707/737 |
| 2012/0066231 A1 | 3/2012 | Petersen et al. | 707/748 |
| 2012/0114307 A1 | 5/2012 | Yang et al. | 386/278 |
| 2012/0150597 A1 | 6/2012 | Kokku et al. | |
| 2012/0244907 A1 | 9/2012 | Athsani et al. | 455/556.1 |
| 2012/0327194 A1 * | 12/2012 | Shiratori et al. | 348/47 |

\* cited by examiner

SYSTEM AND METHOD OF PORTRAYING THE SHIFTING LEVEL OF INTEREST IN AN OBJECT OR LOCATION

FIELD OF THE INVENTION

The field of the invention relates to providing feedback to users of remote electronic devices by altering images and/or presenting additional elements on the screen of a remote device.

BRIEF SUMMARY OF THE INVENTION

The principles and methods of the invention relate to altering the image of an object displayed on the screen of an image capture device to reflect changes in extrinsic information, wherein the extrinsic information may be gathered from image capture devices.

The principles and methods of the invention also relate to a computer implemented method of portraying the shifting level of interest in an object or location, which comprises receiving a real time stream of data at a computer system transmitted from one or more electronic devices, storing data values comprising the real time data stream on the computer system, wherein the data values comprise at least the GPS coordinates and the compass heading of the transmitting electronic device, identifying in the computer system from the data values, a particular object of interest, and determining the state of a cluster using the received stream of data, wherein the determination comprises calculating the number of users of the one or more electronic devices in the cluster from the data stream after the particular object of interest is identified, and transmitting instructions from the computer system to the electronic devices to alter the image of the object displayed on the electronic devices, where the image of the object of interest may be altered in a manner that is proportional to the dynamic state of the cluster. The color hue, tint, tone, or shade of the displayed object of interest may be altered in relation to the dynamic state of the cluster, where the dynamic state can comprise a snapshot of the data and calculated values at a particular time and/or over a period of time.

In addition, the system may communicate queries to the electronic devices relating to the object of interest; and receiving responses communicated from the electronic devices, wherein the image of the object of interest is altered in a manner relating to the responses received from the electronic devices. The system may also provide rewards to users of the electronic devices for received responses by communicating discounts and/or coupons for products related to the object of interest to the electronic devices.

The principles and methods of the invention also relate to a system for sending a message relating to objects of interest at events or locations, which comprises a computer system running at least an application program that receives a real time stream of data over a network from a plurality of remote portable image capture devices and analyzes the data, and a database for storing at least some of the received data wherein the application program is configured to receive a continuous stream of data about the direction the device is pointing from each of the plurality of image capture devices including-information from which the application program determines the geographic location and compass heading of the devices when the devices are using image capturing capabilities of their devices; calculate a location where a line of sight from each of the two or more devices could intersect to identify a potential object of interest from the continuous stream of data about the direction the devices are pointing from each of the plurality of image capture devices; identify a particular object of interest from the calculation; identify from the calculation a cluster of users that are associated with the particular object of interest in real time; and send a message relating to the particular object of interest to each user within an identified cluster, wherein the message causes the display of the object of interest to change.

The system may also be configured to determine a dynamic state of one or more clusters using the received stream of data, wherein the determination comprises adjusting the users that are in the associated cluster after the particular object of interest is identified, and the computer system being configured to send subsequent messages over a network, which would cause the image of the object of interest to change over time in relation to the dynamic state of the cluster.

The computer system may be configured to store information regarding the dynamic state of the cluster, user data associated with each cluster, and the cluster's association with a particular object of interest in computer memory, which may be arranged in a database; and the computer system may be configured to send messages to users that are in the cluster requesting additional information relating to the object of interest.

The computer system may also be configured to store information regarding the features that identify objects of interest, a virtual effect that will be applied to the object when a crowd action or threshold is recognized (e.g., formation of a cluster), and a threshold value, wherein the virtual effect and/or threshold value may be pre-defined and stored prior to identification or associating with a cluster. The information may be arranged in a database; and the computer system may be configured to send messages to users that are in the cluster producing the virtual effect relating to the object of interest. The information relating to the objects of interest may comprise a name, a geographic location (e.g., GPS coordinates, altitude), and/or address, details regarding the object's 3-dimension geometry (e.g., height, width, color, relationship to a company or product brand, etc.) that can be use when identifying the object and/or the point of focus.

A system for receiving a message relating to objects of interest which comprises a remote image capture device running at least an application program that is configured to receive messages over a network from a computer system, wherein the application program is configured to receive messages containing instructions from the computer system wherein the instructions when executed by the application program cause the image capture device to alter an image relating to an object of interest displayed on a screen of the image capture device in relation to the number of additional remote image capture devices focused on the object of interest at approximately the same time.

The system may also be configured to receive responses to the messages communicated from the users through their electronic devices, and store the received information regarding the object of interest within the database as user data associated with the object of interest.

The principles of the present invention also relate to a non-transient computer readable medium configured to carry out anyone of the methods disclosed herein. The application can be a set of instructions readable by a processor and stored on the non-transient computer readable medium. Such medium may be permanent or semi-permanent memory such as hard drive, floppy drive, optical disk, flash memory, ROM, EPROM, EEPROM, etc., as would be known to those of ordinary skill in the art.

The electronic devices can comprise random access memory (RAM), and non-transient computer readable medium that may be permanent and/or semi-permanent memory such as CMOS memory, and flash memory or EEPROM. The electronic devices can also comprise a processor that can download and/or read the instructions from a computer readable medium and cause the electronic device to perform the steps of the different embodiments of the invention and to carry out anyone of the methods disclosed herein. The electronic device can also comprise the electronics necessary for communication over a telephone or computer network as would be known in the art.

BRIEF DESCRIPTION OF THE DRAWINGS

Further features of this invention, its nature, and various advantages will become more apparent upon consideration of the following detailed description, taken in conjunction with the accompanying drawings, in which like reference characters refer to like parts throughout, and in which.

DETAILED DESCRIPTION OF THE INVENTION

The invention relates to a system and method, that may include various different software and hardware components, that can provide an indication of how many people are focusing on an object or location at the same time to each observer. Information may be communicated to each observer's device to convey the aggregate level of interest in the object. For example, the system can perform operations involving tracking of the focus of the cell phones on a location, following changes in a cluster size, and using the information to provide some type of feedback to observers. In an implementation, a number of people with a smart phone focus their cameras on a particular building. An image of the building would appear on each of the screens of the users' smart phones. As additional people also focus their phones on the building at approximately the same time, the image displayed on each of the phones could be changed in real time to indicate the number of people looking at the building at that specific time. In an example, the image of the building itself can be altered to reflect the amount of interest being shown in the building, for example, the color and/or shade of the building may be changed from its real life color. An escalating level of color, advertisement, or entertainment may be displayed on the device screen based on the number of devices being faced at the object or location at approximately the same time. In other embodiments, different icons or screen elements, such as a text box, bar graph, or emoticons, may be overlaid on the screen to display various information relating to the number of viewers. Embodiments of the invention may calculate the shifting levels of interest in an object by determining the number of observers in the group paying attention to the object at each moment over a period of time.

In embodiments of the invention, the device users may be prompted to provide feedback regarding the object or location they are focused upon by the computer system communicating questions to their devices. The received feedback may then be portrayed by further altering the image being displayed on a screen of the electronic device(s).

The system may provide feedback on the user's own actions, such that, the system receives input about what a user is doing, processes it to determine whether there are other people doing the same; and, based on the compiled data from the first user and other people's data, sends one or more messages back to the first user that change the display of the object to a different color. This reactiveness within a graphical image from an image capture device to a user's actions in combination with other people's actions may be processed and stored in a database of the system.

Figure 1:
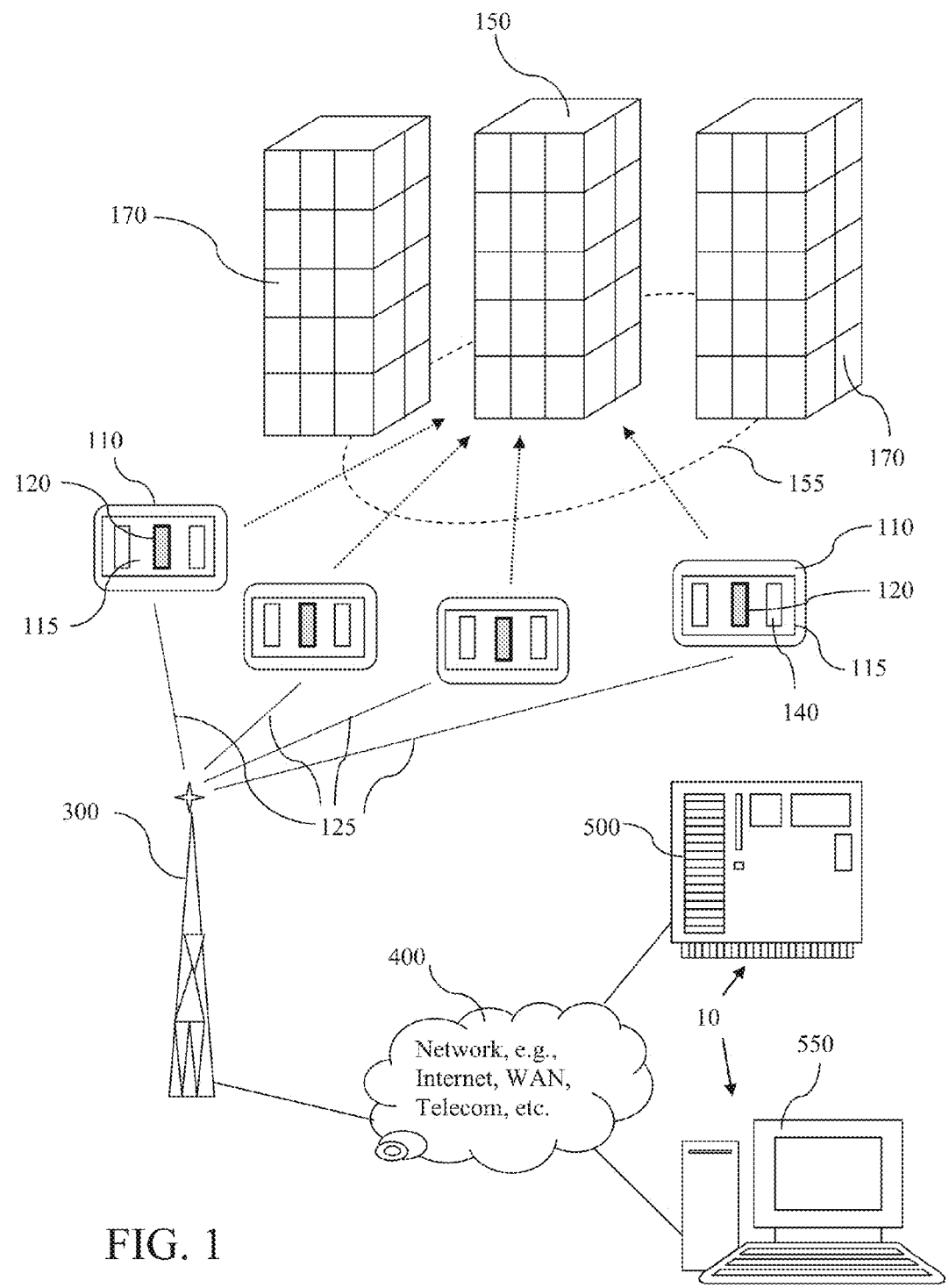
FIG. 1 is a high-level functional block diagram of a system and network for receiving information and communicating messages to remote image capture devices.

A high level block diagram is illustrated in FIG. 1, showing various components of a computer system 10 configured to monitor the mobile electronic devices 110 of one or more users to determine when the devices' image capture hardware is being focused upon a particular building 150 or location 155, as distinguished from other neighboring buildings 170 or locations. The mobile electronic devices 110 may be for example, digital cameras, smart phones, laptop or tablet computers having image capture hardware, or digital cameras configured to communicate data to other computer systems using suitable hardware and software. The mobile electronic devices 110 may have visual displays 115, such as light-emitting diode (LED) or liquid crystal display (LCD) screens, that present images to the user, where the images may be of objects focused upon with the device's image capture hardware. Performance of the process does not require an image to be taken. A stream of data 125 relating to the direction and point of focus may be generated by a remote image capture device 110 once the image capture hardware is initiated by a user, for example, by selecting a device's photo function in anticipation of taking a picture. Use of the view finder to focus on an object once the photo function is initiated can sufficient to generate the real time data including GPS, direction of focus and depth of focus.

The computer system hardware 500, 550, receives a stream of data 125 from the one or more image capture devices 110 in real time, and performs calculations, also in real time, on the data to determine where the device(s) are being focused. Such real-time data communication and collection may have, for example, a sampling rate of between approximately 1 data value per second and 1 data value per microsecond for each of the data fields, so that at least one GPS data point, one compass heading data point, one depth of focus value, and one time stamp, is collected each second or fraction of a second, and the GPS, direction, focus, and time data points are all correlated, as would be known to one of ordinary skill in the art. The continuous stream of data 125 may include the direction the device is pointing from each of the plurality of image capture devices including-information from which the application program determines the geographic location and compass heading of the devices when the users are using image capturing capabilities of their devices.

The computer system 500, 550 can calculate the coordinates of the point of focus from the data stream 125 transmitted by the remote devices 110, and use the determined coordinates to match the received data to a particular object of interest. The coordinates of the point(s) of focus can be correlated with the location of known objects and locations of interest stored in a database. A corresponding virtual effect and related identification information and constructs may also be related to the object in the same database record. Once the coordinates of the point of focus are matched to the actual location of the object, the particular object can be identified.

If the data streams 125 from a plurality of devices 110 indicate that at least a subset of the image capture devices 110 are focused upon the same building 150 at approximately the same time, the system is configured to perform calculations to determine a level of interest in the particular building 150 being focused upon and monitor changes in the level of interest. The subset of image capture devices focused on a particular location can be identified as a cluster of users from a total number of devices.

The continuous stream of data 125 may include the direction the device 110 is pointing from each of the plurality of image capture devices 110 including-information from which the application program determines the geographic location and compass heading of the devices when the devices are using image capturing capabilities of their devices.

As the data is transmitted in real time, the interests of the persons at a particular time or within a time period can be determined and used to identify objects of greatest interest at any particular time at a location. The operation of the devices 110, systems 10, and software in real time updates, communicates, and processes the information at the same rate it is received, particularly when the received data is constantly changing in value.

Data sampling and communication may be faster or slower depending on the constraints of the system 10, networks 300, 400, and requirements of the event being observed. Receiving data in real time refers to receiving data from a remote electronic device 10 with little or no perceptible latency between the time that the data is generated and it is received by the system 10, e.g., nearly instantaneous or with a latency is below a noticeable threshold. For example, as one user increases the level of interest by pointing at something, the other devices are instantly or near instantly updated to present an augmented image reflecting the increase in interest. To implement the augmented image, instructions are transmitted from the system 10 simultaneously or approximately simultaneously to all of the electronic devices 110, so the displayed images are updated on each device screen 115 in a synchronous manner.

A level of interest can be a relative determination that is calculated as a ratio of image capture devices 110 focusing on the particular object 150 compared to the number of image capture devices within a specific distance from the object. The identification of one or more image capture devices 110 may be a real time search based on GPS coordinates of the remote devices in communication with the computer system 10. Specific ratios may be established as thresholds for conveying particular information to the viewers' devices, for example, a 10% ratio of observers focusing on a specific building 150 to the total number of identifies image capture devices within one city block may trigger the communication of instructions to the image capture devices to display the building image 120 in a different color. An increase in the ratio of devices focused on the object over a period of time indicates an increased level of interest, and a decrease in the ratio of devices focused on the object over a period of time indicates a decrease in the level interest.

A level of interest can also be an objective determination based upon the absolute number of observers focusing their devices 110 on an object 150 or location 155 at a particular time. For example, a threshold of twenty-five people focusing on a specific building may be required to trigger the communication of instructions to the image capture devices to display the building image 120 in a different color. An increase in the absolute number of devices focused on the object over a period of time indicates an increased level of interest, and a decrease in the number of devices focused on the object over a period of time indicates a decrease in the level interest.

Use of a ratio can take into account an increase or decrease in the number of devices within a specific proximity from the object or location, which allows identification of relative levels of interest. Use of an absolute value of observers allows faster and clearer determinations of a level of interest.

The data streams 125 transmitted from the one or more mobile devices 110 may be communicated over digital or analog wireless telecommunication systems 300, such as a cellular network, WiFi, and/or WiMax, and network(s) 400 that may include packet switched networks, such as the Internet, local area networks, wide area networks, metropolitan area networks and circuit switched networks, such as public switched telephone networks, that may utilize a combination of cable networks, fiber optic networks, satellite networks, and wireless networks. Data can be collected from the electronic devices 110 as a feed communicated in real time to the computer system 10 over one or more communication networks 300, 400.

The data streams may be communicated in real time to a computer system 10, which can comprise a server or a server system 500 having multiple website, database, and system servers, as well as one or more computers or microprocessors 550, which may perform calculations and determinations on the data and store the data and results in memory. The components 500, 550 of the computer system 10 may be localized and directly interconnected, or be geographically remote and communicate through one or more networks 400. The computer(s) comprising system 10 can include hardware, software and firmware necessary to store, process, and communicate with a variety of other devices, as would be known in the art. This could include volatile and non-volatile memory, processors, expansion cards, modems, Ethernet adaptors, etc, as would be known in the art. It would be understood that data elements are generated and manipulated as part of the software and hardware to provide the features illustratively described herein.

Figure 2A:
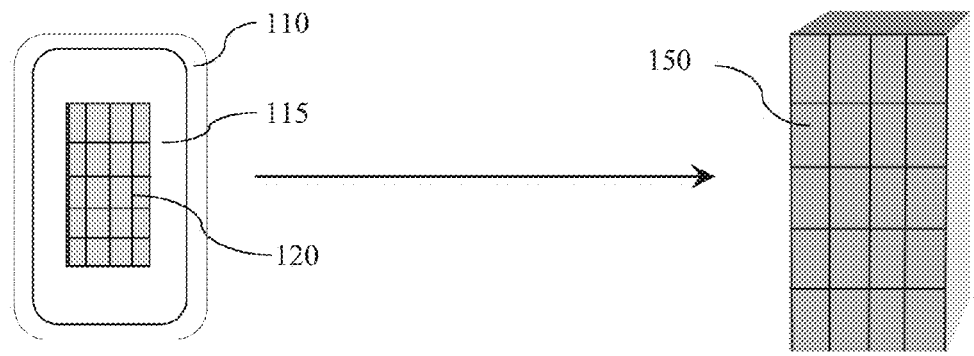
FIGS. 2A-C are high-level functional block diagrams illustrating an embodiment of augmented reality features.
Figure 2B:
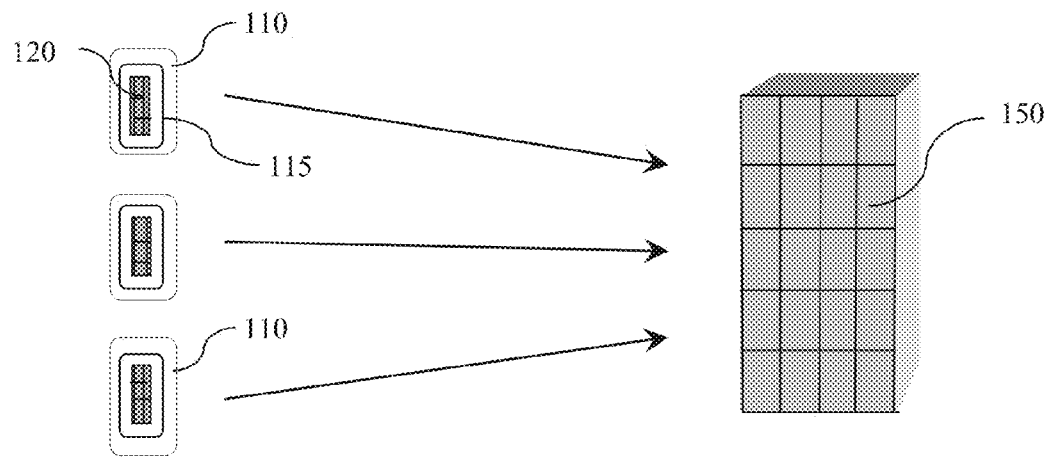
Figure 2C:
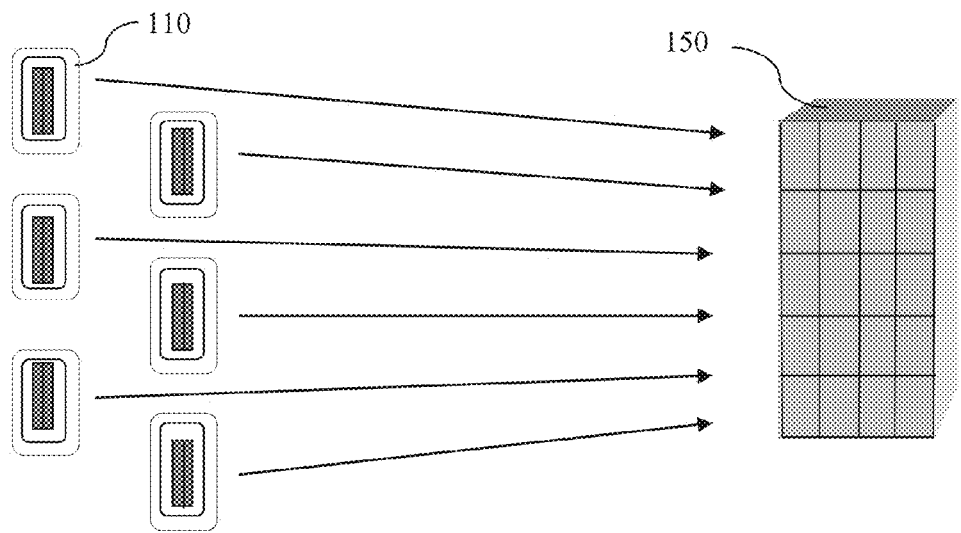

FIG. 2A-C illustrates the augmented reality features of an embodiment of the invention in which the view of a physical, real-world environment is altered to reflect the number of observers focusing their image capture devices 110 on a location or object of interest 150, for example, a building, billboard, or display. The augmented reality features affect the display of images that are displayed on the device's display 115 when the user is using his or her image/media capture device 110 to point at an object or location 150. The virtual affect may be applied in real time when it has been recognized that a cluster is formed from the number of people focusing their devices on the object or location. The image of the location or object 120 on the screen 115, for example of a smart phone or tablet computer 110, can be altered in real time to show the object of interest 150 in different hues or intensities of color as a function of the number of people focusing their devices on, for example, a building and/or the rate at which the number of people in the cluster is changing in time. This real time image augmentation can be within a second or microsecond, as necessary to prevent the observer from perceiving delays in the updating of information.

The progression of the color change is illustrated in FIGS. 2A to 2C, where for example the color of the image 120 may change from a light shade of pink to a dark red to represent "blushing" as the number of observers "staring" at the object or location increases. The image 120 of a real building 150 displayed on the screen 115 of an image capture device 110, for example a smart phone, may be altered to initially appear a light shade of a color when only a few observers are focused on it, as depicted in FIG. 2A. The color of the image may then change to the deeper shade as shown in FIG. 2B, as more observers focus their devices on the building. The image 120 of the building may eventually be displayed in a dark shade on each of the smart phones 110, as depicted in FIG. 2C, once a predetermined number of devices are focused on the building 150. Other objects 170 and locations being displayed as images 140 on the device's screen 115 along with the object of interest 120, may retain their normal appearance or also may be altered in a manner that reflects a separate level of interest shown in those objects 170 and locations.

In an embodiment, there could be a change in the actual display color from yellow to green and then blue, although other sequences of color change are also contemplated. The change in color of the augmented reality image may also depend upon feedback received from the image capture devices indicating for example like (approval, acceptance) or dislike (disapproval, rejection) of the object of interest being focused upon. Observers may be sent a list of available descriptions or reactions to provided them an opportunity to select a particular response, which can be communicated back to the system 10. A calculation of the multiple responses can be used to select a color from a predetermined pallet to represent the mood of the crowd, where the particular pallet and/or color selected may for example relate to a pallet of colors available for a cosmetic line or product, or Robert Plutchick's emotion color wheel. The colors comprising the one or more palette(s) may be stored in a database, and each palette may be associated with a specific object of interest.

In another embodiment, observers may be provided an opportunity to interact directly with the displayed image 120. For example, an observer pointing a first camera at a location, may be provided a color palette for selecting a display color, which would also change the display color in real time of another person looking at the same object or location through their device display to the color selected by the first person. As additional people focus on the object 150 or location, the color of the object being displayed 120 may be further changed. In an embodiment, each person's selection of a color may be treated as a vote, and the color with the most votes at the particular time is communicated to all of the electronic devices 110 to change the color of the object 150 being displayed 120. The color palette from which observers may make their selection may represent the colors available for a product, such as a car or a nail polish, which would enable the manufacture to identify the colors that are more preferred by potential customers.

In another embodiment, the number of devices may be used to calculate the intensity of a color, while a positive rate of change (+dn/dt) in the size of a cluster may be used to select a color, such as yellow, indicating a positive emotion of joy, while a negative rate of change (−dn/dt) may be used to select a color, such as purple, indicating a negative emotion of disgust. The value 'dn' is the change in the number of devices forming a cluster associated with a object or location and 'dt' is the change in time. The '+' represents an increase in the value dn with time, and the '−' represents a decrease in the value 'dn' with time. A zero or neutral rate of change in the size of a cluster, where "dn/dt" remains essentially constant over a period of time, may be used to select a color, such as orange, indicating a more neutral emotion of anticipation.

In another embodiment, the rate of change of the rate of change ($d^2n/dt^2$) may be used to calculate a cluster's response to indicate a stronger emotion, such as fear, or a weaker emotion, such as acceptance, to select a corresponding color from the emotion color wheel. A determination of the hue, saturation, and lightness of a color used for the augmented reality, therefore, may be a function of the number, first derivative, and second derivative of a cluster value, F(n, dn/dt, $d^2n/dt^2$), where the values may change over a period of time. The color may be equated with a particular color, the rate of change equated with a shade of the color, and the acceleration equated with an intensity or brightness of the color.

Figure 3:
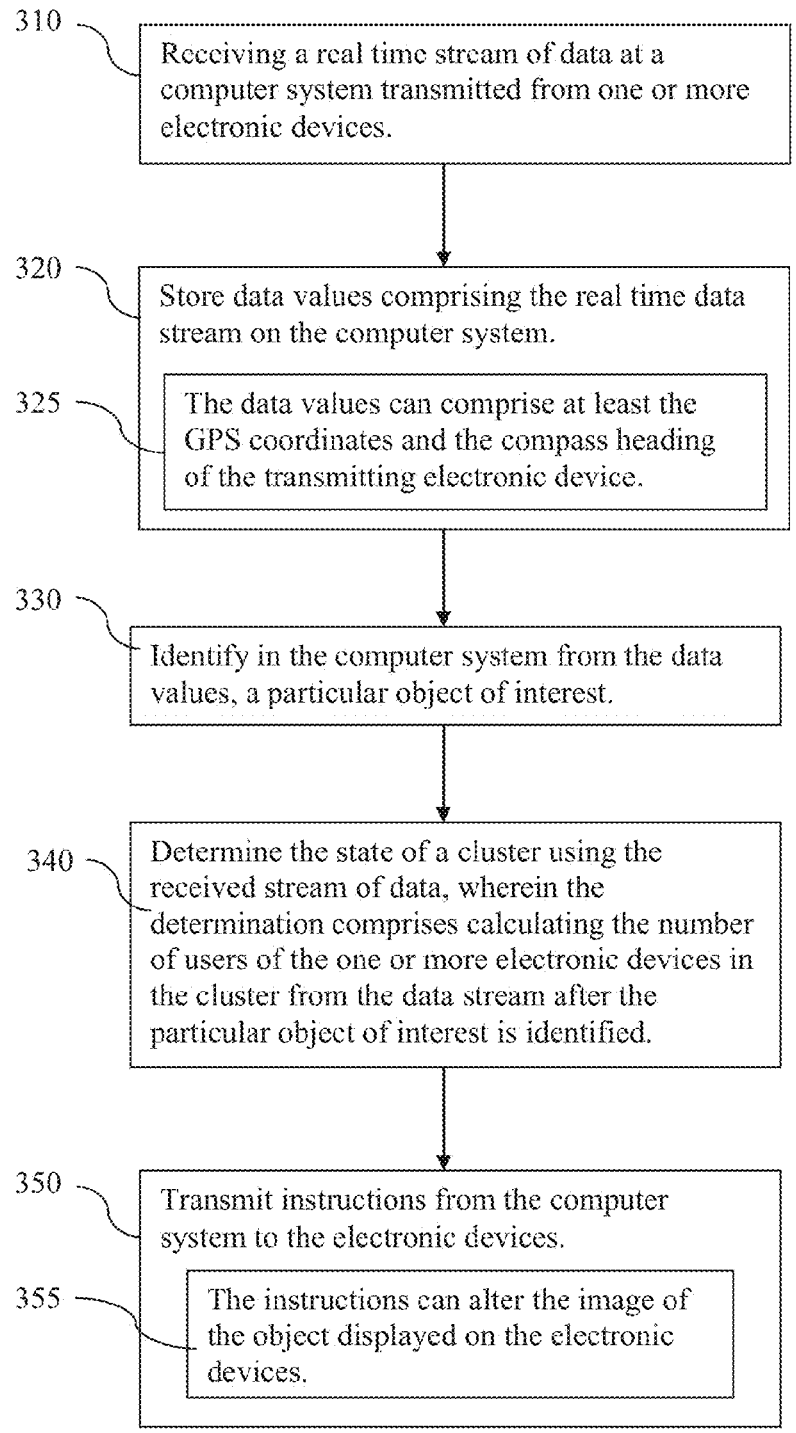
FIG. 3 is a flow chart illustrating a process for identifying a potential object of interest and altering the image of the object displayed on the screens of electronic devices.

FIG. 3 shows a flowchart illustrating a computer-implemented method for identifying a potential object of interest and altering the image of the object displayed on the screens of electronic devices.

At step 310, an object of interest is identified from a stream of data transmitted from one or more electronic devices and received in real time at a computer system. Real time data transmission and reception refers to communication between device(s) and system(s) with little or no perceptible latency between the time that the data is generated and it is received by another system. For example, the data is available at the computer system 10 nearly instantaneous or with a latency is below a noticeable threshold from the time it originated at a remote device 110. An electronic device can be a device with a camera or image capture capability that can operate independently and remotely from other systems, for example, cell phones including smart phones, personal digital/data assistants, palmtop, tablet and laptop computers, digital cameras and video recorders, which can capture image media and communicate data over a network. The image capture capabilities of the hardware may be initiated by a user, and generate a stream of data, without an image or video being captured.

When observers point their electronic devices at an object or location, which does not require a photo to actually be taken, the object or location is recognized as generating a level of interest related to the number of devices focused upon it at the same time. An object can refer to a distinct structure or physical entity and location can be a geographical position or area, where an object may be situated at a particular location. The object of interest can be identified through triangulation of the two lines of sight from two or more electronic image capture devices or through the position, direction of facing, depth of focus and focus distance of a single image capture device. Multiple people focusing on the same target can create a cluster due to the intersecting lines of sight creating points of focus that are congregated in a specific area. At step 320, data values received from the remote electronic devices are stored on a computer system, which may comprise a database that organizes the data in various records and fields as known in the art. At step 325, data values comprising at least the GPS coordinates and the compass heading of the transmitting electronic device may be identified in the stream of data and stored in appropriate fields of the database for calculations and identification of clusters. The computer may match the received data to an object of interest by, for example, matching the coordinates or other location information of the observers or points of focus to similar data for an object or area of interest previously identified and stored in a database.

At step 330, the application software may identify who is looking at an image at the same time, where the application software may be implemented on the remote devices and/or the computer system. A computer system may identify an object of interest by correlating a number of focus points with a stationary location or moving object, where the number of focus points is above a statistical baseline value. The people focusing on the same object can be identified by the GPS positions of their electronic devices. At step 340, the state of a cluster may be determined using the received stream of data, wherein the determination comprises calculating the number of users of the one or more electronic devices in the cluster from the data stream after the particular object of interest is identified. The state of a cluster may be identified by the number of observers and/or points of focus within the cluster, the devices forming the cluster, a location or object associated with the points of focus, a rate of change in the population of the cluster, and a the time that the state is specified. A mobile object may be known to be present at a particular location at a particular time, or could be identified by separately communicated information.

At step 350 instructions can be transmitted from the system 10 to each of the remote electronic devices 110 to cause modification of the image that would normally be displayed when the image capture device is point at an object. The remote device 110 can be configured to run an application, where the application would receive data and instructions from the system 10, and interact with the image capture hardware, and image display component of the device, to alter the image received through the camera and/or view finder and displayed on the screen. Instructions can comprise computer code and/or scripts that causes a device to operate in a specific way or perform a specific action, where the instructions may be implemented by the application software running on the remote device. Once people focusing on the same object are identified, a message may be sent to their smart phones. The object's color characteristics may be modified in real time to reflect the level of interest expressed in the object at that same time. Augmented reality advertising can involve adjusting the displayed image of the real object being focused upon. The object may be displayed in a color different than the color the actual objects appears, for example, a concrete and glass building may be displayed in a different color or different shades of colors, such as pink, red, maroon. The color may then be changed as the number of people focused on the building changes over time. The cluster of observers can be identified with the object of interest, the cluster and its association with a particular object of interest can then be stored for analysis, and particular colors and elements selected based upon the calculation to alter the image displayed on the observers' device screen.

In this manner, the system provides feedback on the device-user's own actions by receiving input about what the device is focused upon, processes data received from multiple devices to determine if there other device users focusing on the same object or location, and based on the collective data, and sending one or more messages back to the device that may change they display of the object. This reactiveness of the graphical image from an image capture device to the user's actions in combination with other people's actions produces an aggregate result.

The changing state of a cluster may be mapped to reflect user momentum and intensity, and individual devices belonging to one or more identified cluster(s) sent particular questions, as for example a survey or poll, to obtain information from each of the identified cluster(s). The cluster data could be mapped to a visual display to show the location of the devices and the respective points of focus of the devices. Changes in the location of devices and their direction of facing can be shown on a map over time to depict changes in observers' interest and significance of the object. The dynamic changes in interest and significance can also be used to direct third-party broadcasting and advertising to the associated cluster(s) of device users.

In another embodiment, the level of interest in a particular object could be used to alter images displayed on the object itself, for example changes in interest level could be used to alter the display on an electronic billboard as the number of observers increases or LED lighting of a building. For example, a billboard display could change from a simple still display of a product to an animated display showing someone using the product, then to an elaborate presentation once the number of viewers has reached a threshold level.

Figure 4:
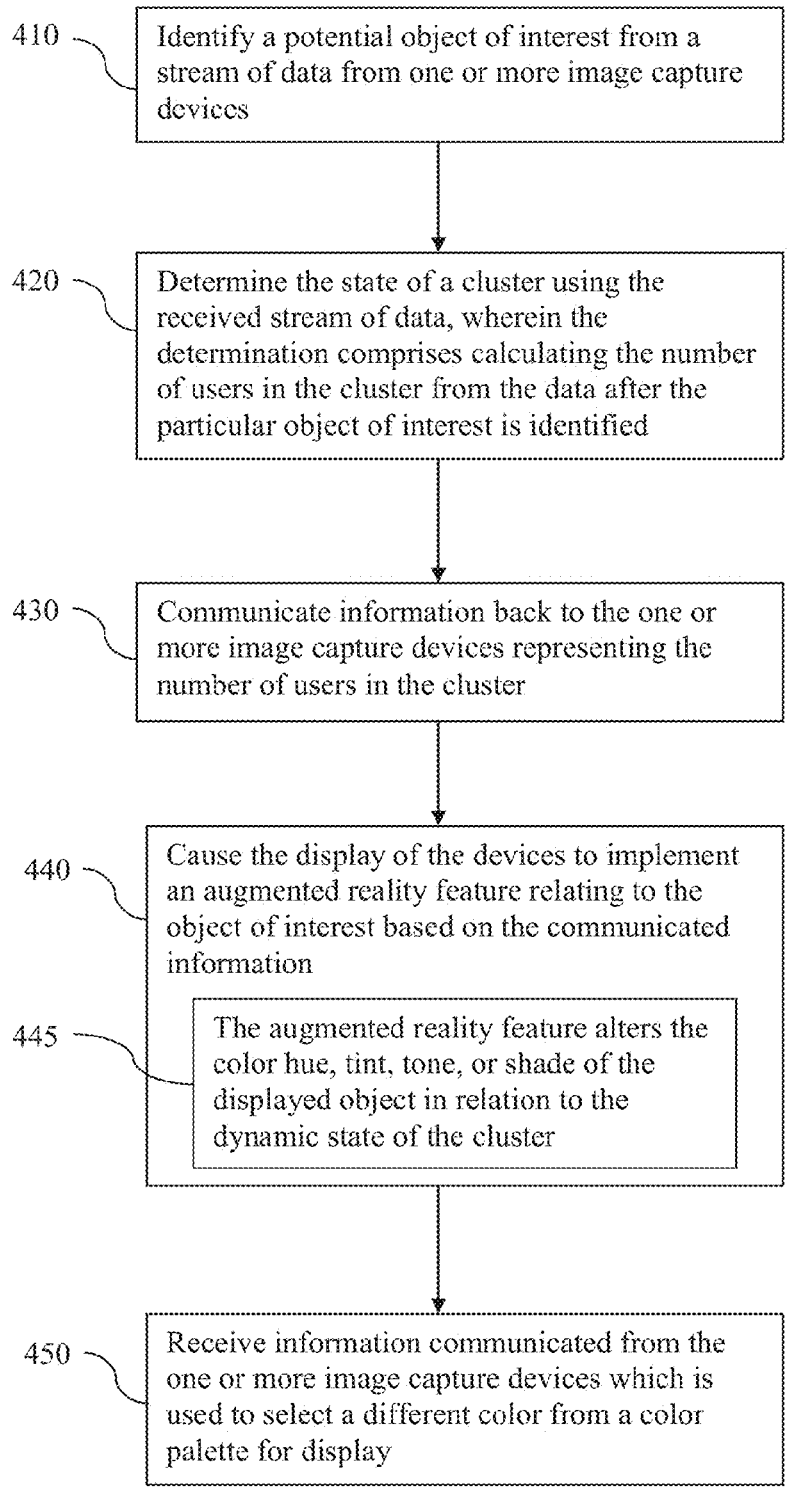
FIG. 4 is a flow chart illustrating a process for providing augmented reality rendering of objects on an electronic device display.

FIG. 4 shows a flowchart illustrating a computer-implemented method for providing augmented reality rendering of objects and/or locations shown on a screen of an image capture device, where the server can cause the display of the image capture devices to implement an augmented reality feature relating to the object of interest.

At step 410 an object of interest is identified from a stream of data indicating a point of focus of one or more image capture devices communicated to a computer system. The object of interest may be picked out and distinguished from other objects in the same area or in proximity to each other, where the object of interest may be identified by one or more pre-existing data elements and characteristics (e.g., location, name, 3-d geometry, feature recognition). At step 420, the number of image capture devices identified as focusing on the same object or location is calculated by the computer system and correlated as a cluster of observers and their corresponding points of focus, where the number of focusing devices may be calculated from information in the data stream(s). The data and calculations may determine the dynamic state of the cluster in real time, by analyzing the points of focus to determine where the focus points coincide to form a cluster, wherein the cluster represents the set of related focus points and the devices associated with the focus points. The dynamic state can comprise a snapshot of the data and calculated values at a particular time and/or over a period of time. The dynamic state may also be represented as a series of snapshots to determine changes over a period of time, which may indicate the shifting level of interest in an object or location.

The cluster can have a size determined by the number of points in the cluster, and the image of the object of interest may be altered in a manner that is proportional to the cluster size. At step 430, the computer system communicates to the observer(s) image capture device(s) information and/or instructions configured to cause the display of the devices to render an augmented image in real time, where the image may be of the object being focused upon by the device's image capture hardware. In embodiments of the invention, only the object identified as the object of interest is augmented in response to the detection of the level of interest. The rest of the image on the device screen containing the object of interest remains unaltered or is altered to a different extent indicated by the respective level(s) of interest in other objects.

In another embodiment, the computer system may prompt the user to answer questions at step 445, where the questions are communicated to the user of the device to obtain information, and instructions that cause the augmented reality feature of an application program to change the color of the object or location being shown on the device screen to a different color hue, tint, tone, or shade in response to the information obtained from the user. The particular hue, tint, tone, or shade may be determined from the dynamic state of the cluster as calculated in step 420, or the replies received in response to step 445. At step 450, information inputted into the image capture devices may be received by the computer system and used to determine additional changes to the color hue, tint, tone, or shade, or selection of a different color pallet from which to select different colors.

In another embodiment, a message may be sent to the electronic devices asking the observer questions regarding the object of interest, the company associated with the object of interest, and/or the products associated with the object or the company. The server can communicate a request for an evaluation of what the observer(s) think of what they are viewing. This could involve the observer being queried with a series of predetermined questions and a set of answer selection in a drop-down menu style format to specify why they are looking at a particular object or location, whether or not they like what they see, and whether they have any preference to see something more or different. For example, an observer that is focusing on a building may initially be asked to identify why they are focused on the building, and provided with a set of predetermined answers, such as 1) the architecture, 2) the company located in the building, and/or 3) the products made by the company. Once the observer has identified a reason for their interest, they could be asked if they like or dislike the building, company, or products, and provided, for example, with a scale of 1 to 5 ranging from strong dislike to strong like. The answers received by the server from the observer could be used in calculations to affect a change in the image being viewed through alternate reality. For example, if the observer indicated that they disliked the products manufactured by the company, the image could change from a neutral color on the Robert Plutchick's emotion color wheel, such as an orange for interest or green for acceptance to a different color representing a negative emotion, such as pink for boredom or red for annoyance. In contrast, if an observer indicated that they strongly liked the company's products, the color of the image shown on their screen could change to a bright yellow indicating joy or a dark green indicating admiration. The server may also respond to the provided information by sending an electronic coupon for a product to the observer to reward them for their loyalty and appreciation.

Color pallets may for example contain a particular gamut of colors, and restrict selection to only those available, such as a line of cosmetics or automobiles, which may only be available in specific colors. Other color pallets may comprises a very broad range of hues, tints, shades, and tones as could be calculated using different color models (e.g., RGB, RYB, HSV, etc.), as would be known in the art of color theory.

Figure 5:
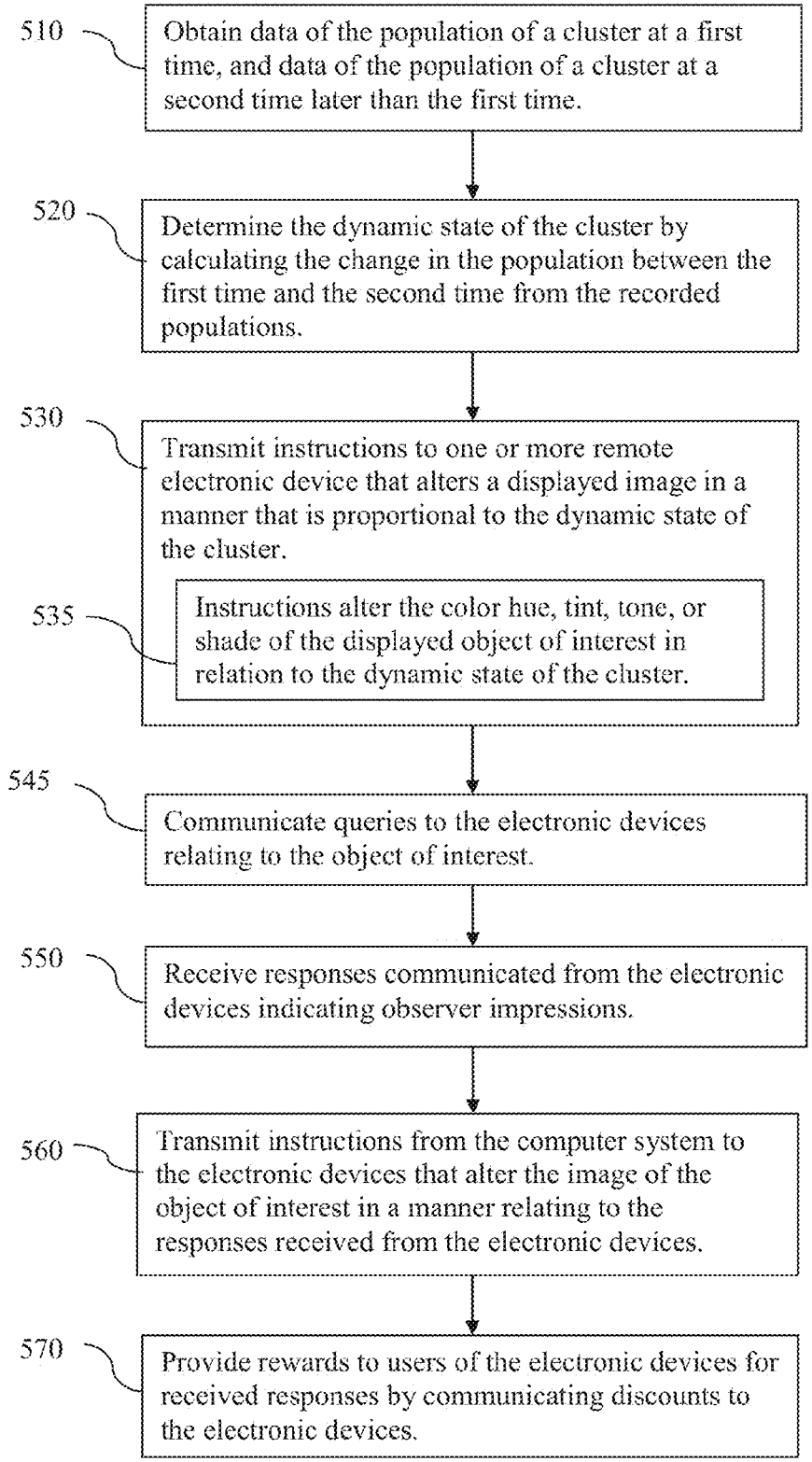
FIG. 5 is a flow chart illustrating a process for communicating information to remote devices.

FIG. 5 shows a flowchart illustrating a computer-implemented method for obtaining data regarding a dynamic state of a cluster and sending questions to members of the cluster to obtain personalized feedback about the object of their interest. At step 510, the computer system obtains data transmitted from one or more electronic devices at a first time and data transmitted from one or more electronic devices at a second time, regarding the devices' position and direction of focus. At step 520, the computer system calculates the change in the population of a cluster at a first time and at the second time later than the first time from the obtained data to determine the dynamic state of the cluster. The software running on the computer system can identify the image capture devices being pointed at an object at the same time, and assign those devices to a cluster. By identifying an object of interest and the image capture devices that are focused upon the object of interest, the computer can determine the number of devices forming a cluster. By monitoring the number of devices forming the cluster over time, the computer system can determine the dynamic state of the cluster, which can include changes in the population of the cluster (dn), the rate at which the population changes (dn/dt), and the acceleration or deceleration in the rate of population changes ($d^2n/dt^2$).

In step 530, the system can transmit instructions to the one or more remote electronic device that alters a displayed image in a manner that is proportional to the dynamic state of the cluster. The instructions may be computer code that can be interpreted by the remote electronic image capture device to cause changes in the way the image is displayed on the screen of the device. The instructions can be communicated over a combination of wired and wireless communication channels, including telephone, cable, fiber optic, and internet networks, where the instructions are transmitted simultaneously or nearly simultaneously to all identified devices with the system calculations. The remote electronic devices can receive the communicated instructions, and an application program running on the devices can implement them to modify the image of objects within the device's viewfinder when the user is pointing the image/media capture device at an object or location. In step 535, computer instructions that are configured to alter the color hue, tint, tone, or shade of the displayed object and transmitted to the remote devices by the computer system. The selection of the color hue, tint, tone, or shade by the computer system is based on the proportional changes in the dynamic state of the cluster. In step 545, the computer system transmits queries to the electronic devices relating to the object of interest. The queries can comprise one or more questions regarding the object at which the observer is pointing his or her image capture device, where the question(s) may request, for example, feedback on the observers like or dislike of the object of interest, on the architecture of a building, or the observer's interest in one or more products related to the object of interest. A selection of choices or answers may also be communicated to the remote devices to provide the observer a pre-arranged set of answers to the questions. The observer using the device may select one of the predetermined answers or provide independent feedback. The application program may configure the device to transmit the response to the computer system.

In another embodiment, the camera holder can be asked to vote on a particular topic or to select one response from a set of responses to gauge their interest or opinion on a particular topic. A topic may be whether the observer enjoys driving, how often they wear a type of make-up, or where they would like to go on a vacation. This would be obtaining an instant poll on what the party's opinions are on different issues related to what they are viewing. For example, an airline may be interested in obtaining information regarding preferred destinations for travelers, whereas a cosmetic company may wish to find out how often an observer uses eye shadow. The observer may be rewarded with a promotional discount. To motivate observers to focus on billboards or buildings, the value of the promotional discount or coupon may increase in relation to the amount of interest and/or number of observers focusing on the object or location at the same time.

At step 550, the computer system receives responses communicated from the electronic devices providing answers to the queries and/or indicating observer impressions. At step 560, the computer system transmits instructions from the computer system to the remote electronic devices that alter the image of the object of interest in a manner relating to the responses received from the electronic devices. For example, if an observer indicate that they like or approve of the object of interest, the computer system may transmit instructions that will cause the display color of that object to change to a different color considered warmer or more appealing color, such as red or green, whereas an indication of dislike or disapproval may result in a colder or less appealing color, such as light blue or mustard yellow.

At step 570, to compensate the device user for providing a response, a reward may be provided to the user. A discount or coupon may be communicated by the computer system to the remote device, which can be printed or otherwise redeemed by the user. The coupon or rebate may relate to a product marketed by a company associated with the object of interest. For example, if an observers faces his or her image capture device at a building owned by a product marketer or manufacturer, and provides positive feedback relating to the company or product, a coupon may be communicated to the observer's remote device for a discount or free trial.

Another embodiment relates to where a message transmitted to the identified electronic devices is an advertisement for a product or service. Such advertisement may be, for example, a product promotion, celebrity endorsement, display ad, a coupon, and/or augmented reality feature.

Figure 6:
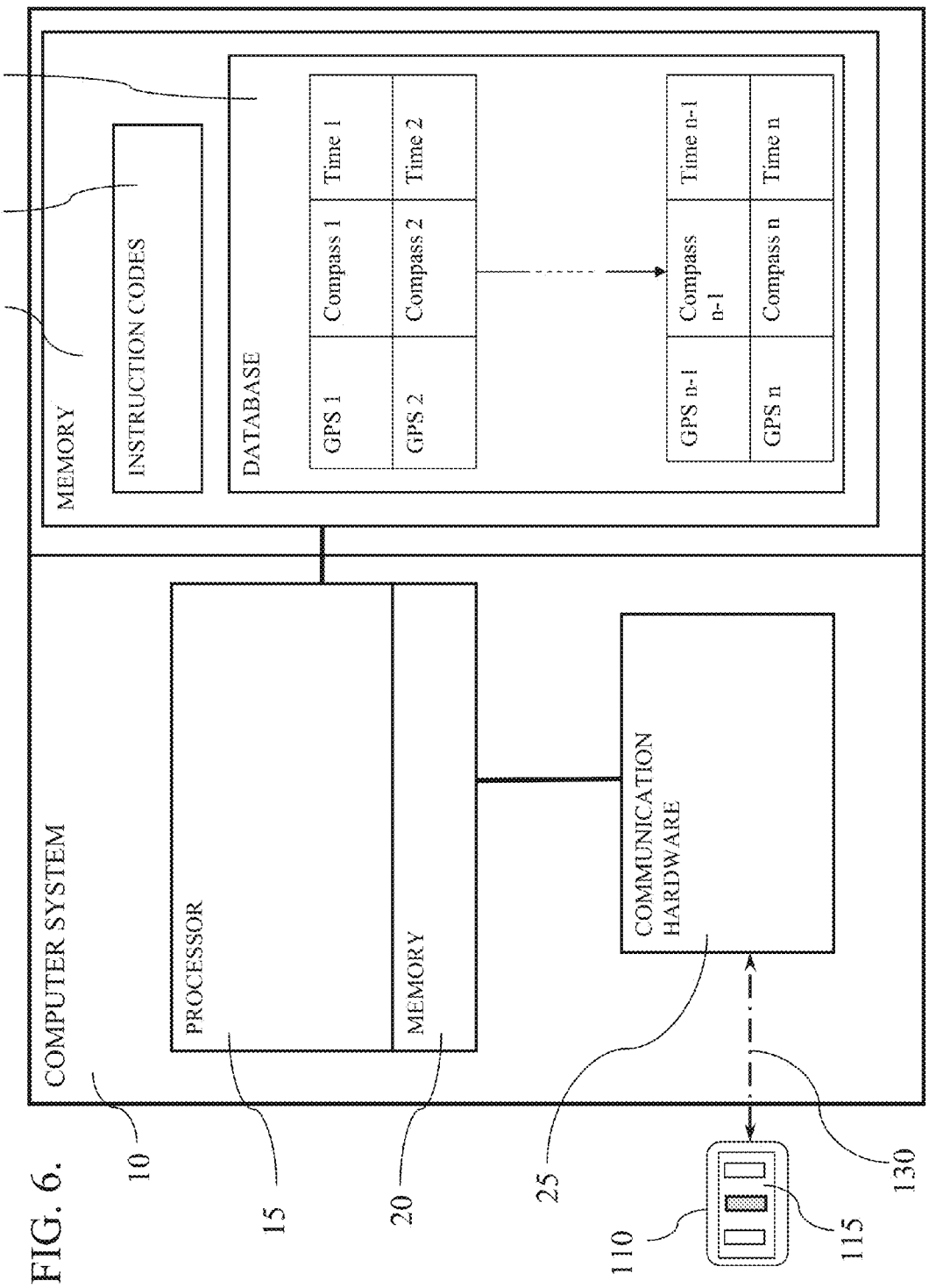
FIG. 6 is a functional block diagram illustrating an embodiment of a computer system configured to be in communication with remote systems in accordance with an embodiment of the present invention.

FIG. 6 illustrates an embodiment of a computer system 10 and data base structure 40 employed to communicate with remote devices 110, identify clusters, and alter the image displayed on the device screen 115. A remote image capture device 110 is in communication with computer system 10 over communication lines 130 including wireless communications 300 and networks 400. A real time data stream from the remote device 110 is transmitted to the computer system 10, where it is received instantaneously or almost instantaneously from the remote devices once the data is generated, and may comprise at least one GPS data value, one compass heading data value, one depth of focus value, and one time stamp. The data values may be processed by the computer system 10 in real time, such that the results are produced with a non-detectable delay from the time that the remote devices produced the data being operated upon, wherein the computer system has one or more processors 15 for performing calculations on the data values and storing the values and results in computer system memory 30. The data values may be stored in a structured database 40 comprising records and data fields. Multiple data values at different times for different remote devices 1-n may be stored and associated in the database 40 for additional processing. Calculations on the data received by the computer system 10 in real time and previously stored data values may be used to identify clusters, where the clusters comprise the devices themselves and points of focus associated with the one or more devices.

Information regarding details and/or features that identify objects of interest may be stored in a computer system. Particular virtual effect(s) that may be applied to the object when a crowd action or threshold is recognized along with a threshold value, may be stored in the database in relation to identified object. The virtual effect and/or threshold value may be pre-defined and stored in a database record prior to identification of the object by viewers or association with an identified cluster. The virtual effects may be a change in a display color, where the display color is selected from a palette of different, available colors stored in the database. The information may be arranged in a database in records and fields, as would be known in the art. The information relating to the objects of interest may comprise a name, a geographic location (e.g., GPS coordinates, altitude), and/or address, details regarding the object's 3-dimension geometry (e.g., height, width, color, relationship to a company or product brand, etc.) that can be use when identifying the object of interest and/or the point of focus on the object.

Data identifying the cluster(s) and additional information such as an identified object of interest tagged to the clusters may also be stored in computer memory 30 in the same or a separate database than the other stored data values. A cluster may be tagged with information to further identify the object of interest or determine its relevance. The information can be provided by the observers transmitting images tagged with metadata about the object or responding to questions about the object of interest. Information can be sent from the server to the electronic device and include the identification of the object or objects of interest being focused on, additional background information regarding the object or venue where the object is located, and/or advertisements for products related to the object of interest by for example focusing on a building associated with the company that makes the product. For example, a car manufacturer may send an advertisement for the brand of car when an observer focuses on the headquarters of the manufacturer. In another example, the different colors of a cosmetic product may be used to tint the building displayed on a device screen in a shifting pattern, or the building may appear to "blush" over time as the observer maintains their focus on the building or billboard. The building or billboard image may also appear to blush as additional people focus on the real building associated with the cosmetic line.

The software applications running on computer system 10 and remote device(s) 110, alone or in combination can identify the actual object of interest 150 and the corresponding image 120 of the object displayed on a device screen 115, and distinguish the object image 120 from surrounding image features. The object of interest image may be differentiated from other displayed objects by identifying each object's boundaries, such as detecting the vertical lines of a building to isolate it from neighboring buildings, or the horizontal lines to distinguish roads, curbs or sidewalks from each other and surrounding buildings and cars. The application(s) may build wire frame constructions from image boundaries, such as abrupt changes in color or repeated features and patterns that may not naturally occur, or identify key identifying features such as marquees or logos, e.g., McDonald's Arches. The wire frames or features may then be compared to a catalog of such constructs or known features to tag the object with a general primary descriptor, e.g., building, car, billboard, street, person, etc., or specific descriptor, e.g., Sears Tower, McDonalds, etc., depending on the complexity and breadth of the object catalog.

An object may be recognized in a new image by the remote application breaking down the displayed image into features and individually comparing each feature from the new image to the database to find a candidate matching each of the features.

Image identification may also be accomplished by the computer system 10 identifying the point of focus, correlating the geographic location of the point of focus, to an object or location, searching a catalog of image constructs stored in a database for a construct associated with the location, sending the construct to the remote device, and the remote device matching the construct features with displayed image features to isolate the object from the surrounding image. A construct may be comprised of lines and vertices stored as a set in memory. The location and distances between lines and vertices of the construct could be matched with the displayed image, taking into account the direction of focus.

Once a construct is mapped to a displayed feature, the pixels making up the portion of the image within the construct could be altered in a defined way to implement the virtual effect. The virtual effect could be for example changing the color of the pixels within the boundary of the construct to its complementary color, a different color based on a formula, or to a specific color from a particular, stored color palette. The virtual effect could also be the addition of a creation that does not have a corresponding real-world existence, for example, an emoticon, a stick figure, a cartoon character, or a realistic object not present in the actual scene. The augmented reality image comprising the unaltered images of the surrounding objects and the altered image of the object of interest or additional creation is then displayed to the user of the image capture device.

If the point of interest is a location rather than a discrete object, the application(s) could calculate the outer bounds of the points of focus and apply the virtual effect to the general area within the boundary. The computer system may calculate where there is a cluster of points of focus within an area, including in a part of the sky, and recognize a volume of space or surface area that has generated a level of interest.

The virtual effect could be a specific effect that was previously chosen by an owner or agent of the object or location, where the effect is intended to convey a particular message to the observers, for example an advertisement or promotion. The virtual effect could also be a predetermined effect specifically associated with a particular object or location, for example, a video clip of the Woodstock concert could be overlaid on an image capture device screen when the device is focused on a point within the geographic boundary of the cite of the Woodstock farm in New York, or an image of the Hindenburg could be displayed on a device identified as being located in Lakehurst, N.J. and pointing towards the sky.

The data received from the remote devices, the calculations, each of the effects communicated to the remote devices, and the resulting effects generated on the device screens would be in real time to eliminate delays that would otherwise be noticeable to the device user.

The computer system may also comprise instruction codes 35 of the application software stored in the computer memory 30. The computer system 10 is configured to determine an object or location of interest by processing the communicated remote device data and calculating the devices' points of focus. A point of focus may be calculated by triangulating the lines of sight of at least two image capture devices, or by determining the GPS location, compass heading, and depth of focus of an individual image capture device.

The computer system can be configured to communicate with the remote devices using communication hardware 25 that may be integral with the computer system or separate external hardware. The codes 35 may also include instructions to be transmitted from the computer system 10 and received by the remote devices 110. The computer system may be configured to send messages to users that are in the cluster to produce the virtual effect on the remote device display, where the effect is related to the object of interest by one or more characteristics—e.g., location. For example, the object may be a billboard advertising a particular product, such as a car, so the relational characteristic is the location of the billboard associated with the car brand being displayed, and the virtual effect may be to overlay an animated version of the car on the billboard displayed on the device screen.

In an embodiment, the changing state of a cluster may be mapped to reflect user momentum and intensity, and individual devices belonging to one or more identified cluster(s) may be sent particular questions, as for example a survey or poll, to obtain information from each of the identified cluster (s). The cluster data could be mapped to a visual display to illustrate "hotspots." The display could then track movement of and changes in the hotspots over time and reflect the changes in the way the object(s) and location(s) were displayed, for example, by changing the color from a blue to a red and back to a blue as the interest heated up and cooled down over time. The dynamic changes in interest and significance may also be used to direct third-party communications to the associated cluster(s) of device users, which may include advertisements and broadcasts.

The application software also comprises an analysis engine that can collect information in real time from remote devices and analyze the collected data to determine the number of image providers focusing on a particular target at a particular time, calculate the proportionate number of remote devices focused upon different targets at the same time or over the same time period, and determine the relative amount of audience interest in each target or sub-target at that time or over that period using statistical calculations known in the art. Receiving data in real time means that the information is received as it is generated by the client device in instantaneous or nearly instantaneous way, and performing calculations in real time means calculating values instantaneously or nearly instantaneously as the data is received. Transmitting information and messages in real time means sending the information and messages instantaneously or nearly instantaneously as the calculations result in a determination or identification that generates a transmitted message and/or information.

Confidence intervals and other statistical values known to those skilled in the art can then be used to determine the accuracy of the amount of audience focus and newly determined popularity of each of the targets. The analysis engine can be configured to make sense of the collected data and extracted information, and can store the information for either real-time use at the event or later use at subsequently organized events with the same or similar participants.

The advertisement is communicated to an observer's image capture device, and displayed in at least a portion of the image capture device's viewer. The image capture devices receiving a particular communicated advertisement may be chosen randomly from all image capture devices present at the event.

The mobile devices and mobile applications also can perform some or all of the processing that is described as being performed at a server, central computer, or other computer system (e.g., collecting, determining, identifying, etc.). The illustrative methods or processes are implemented using computers, memory, processors, mobile devices, software, displays, communication devices, input devices, and other computer system components known to those in the art.

The remote application program is a set of computer readable instructions that may either be stored on non-transitory computer readable medium of the remote device or downloaded from the server to temporary memory in the remote device, or may be located in the cloud, and that can be executed by a processing system, wherein the instructions and/or processing system may be located on one of the remote devices, on a single computer or server, or distributed over a plurality of remote devices, computers or servers. An application program can comprise one or more application programs. An application program can comprise multiple functions performing different processes for implementing the different embodiments of the invention.

One or more features illustratively described herein can be implemented individually or in various combinations. The present system, method, or related inventions also relate to a non-transient computer-readable medium configured to carry out any one of the methods disclosed herein or variations thereof. A software application(s) for carrying out the methods can be a set of instructions readable by a processor and stored on the non-transient computer-readable medium. Such medium may be permanent or semi-permanent memory, such as hard drive, floppy drive, optical disk, flash memory, ROM, EPROM, EEPROM, etc., as would be known to those of ordinary skill in the art.

The processes, steps, or methods illustratively described herein can be implemented using the described examples of hardware and network configurations.

Transmission and reception of data or information can be between computers, databases, storage devices, or internal computer equipment is carried by transmitting electrical signals (e.g., carrying packets or messages) using computer equipment and are also carried by generating signals in response (e.g., consistent with the steps or processes described herein). A computer or computer system can be one or more computers. A network can also involve multiple networks.

The terms and expressions which have been employed in the specification are used as terms of description and not of limitations. There is no intention in the use of such terms and expressions to exclude any equivalents of the features shown and described or portions thereof, but it is recognized that various modifications are possible within the scope of the claims to the invention.

Those of ordinary skill understand from the present description that the illustrative elements, processes, or steps described herein can be implemented in different arrangements, sequences, or orders if desired. Also, elements and steps can be removed, modified, or added without varying from the scope and principles of the present invention, as recited in the claims.

The present application is related to U.S. patent application Ser. No. 13/414,513, filed Mar. 7, 2012, and Ser. No. 13/653,228, filed Oct. 16, 2012; and U.S. Provisional Applications 61/539,718, filed Sep. 27, 2011, 61/495,335, filed Jun. 9, 2011, and 61/450,092, filed Mar. 7, 2011, which are all expressly incorporated herein by reference in their entirety for all purposes.

What is claimed is:

1. A computer implemented method of portraying the shifting level of interest in an object or location, which comprises:
   receiving a real time stream of data at a computer system transmitted from one or more electronic devices;
   storing data values comprising the real time data stream on the computer system, wherein the data values comprise at least the GPS coordinates and the compass heading of the transmitting electronic device;
   identifying in the computer system from the data values, a particular object of interest;
   tracking of the one or more electronic devices and the duration of the one or more electronic devices focused on the identified object of interest, wherein an increase in a ratio of the one or more devices focused on the object of interest over a period of time indicates an increased level of interest and a decrease in the ratio indicates a decrease in level of interest;
   determining the state of a cluster using the received stream of data, wherein the determination comprises calculating the number of users of the one or more electronic devices in the cluster from the data stream after the particular object of interest is identified; and
   transmitting instructions from the computer system to the electronic devices to alter the image of the object displayed on the electronic devices.

2. The computer implemented method of claim 1 wherein the image of the object of interest is altered in a manner that is proportional to the dynamic state of the cluster.

3. The computer implemented method of claim 2, wherein the color hue, tint, tone, or shade of the displayed object of interest is altered in relation to the dynamic state of the cluster.

4. The computer implemented method of claim 1, which further comprises communicating queries to the electronic devices relating to the object of interest; and
   receiving responses communicated from the electronic devices, wherein the image of the object of interest is altered in a manner relating to the responses received from the electronic devices.

5. The computer implemented method of claim 4, which further comprises providing rewards to users of the electronic devices for received responses by communicating discounts for products related to the object of interest to the electronic devices.

6. A system for sending a message relating to objects of interest at events or locations, which comprises:
   a computer system running at least an application program that receives a real time stream of data over a network from a plurality of remote portable image capture devices and analyzes the data, and a database for storing at least some of the received data wherein the application program is configured to:
   receive a continuous stream of data about the direction the device is pointing from each of the plurality of image capture devices including information from which the application program determines the geographic location and compass heading of the devices when the devices are using image capturing capabilities of their devices;
   calculate a location where a line of sight from each of the two or more devices could intersect to identify a potential object of interest from the continuous stream of data about the direction the devices are pointing from each of the plurality of image capture devices;
   identify a particular object of interest from the calculation;
   track the plurality of the remote portable image capture devices and the duration of the plurality of the devices focused on the identified object of interest, wherein an increase in a ratio of the plurality of the devices focused on the object of interest over a period of time indicates an increased level of interest and a decrease in the ratio indicates a decrease in level of interest;
   identify from the calculation a cluster of users that are associated with the particular object of interest in real time; and
   send a message relating to the particular object of interest to each user device within an identified cluster, wherein the message causes the display of the object of interest to change.

7. The system of claim 6, which further comprises identifying a particular virtual effect related to the object of interest, and sending the message to the remote device(s) that causes the display of the object of interest to change in the manner indicated for the particular virtual effect.

8. The system of claim 6, which further comprises determining a dynamic state of one or more clusters using the received stream of data, wherein the determination comprises adjusting the users that are in the associated cluster after the particular object of interest is identified, and the computer system being configured to send subsequent messages over a network, which would cause the image of the object of interest to change over time in relation to the dynamic state of the cluster.

9. The system of claim 7, which further comprises storing information regarding the dynamic state of the cluster, user data associated with each cluster, and the cluster's association with a particular object of interest in computer memory; and the computer system being configured to send messages to users that are in the cluster requesting additional information relating to the object of interest.

10. The system of claim 9, which further comprises the computer system being configured to receive responses to the messages communicated from the users; and storing information regarding the object of interest within the database as user data associated with the object of interest.

11. A non-transient computer-readable medium encoded with a computer program, the computer program comprising instructions that when executed by a computer system cause the computer system to perform operations comprising;

receiving a real time stream of data at a computer system transmitted from one or more electronic devices;

storing data values comprising the real time data stream on the computer system, wherein the data values comprise at least the GPS coordinates and the compass heading of the transmitting electronic device;

identifying in the computer system from the data values, a particular object of interest;

tracking of the one or more electronic devices focused on the identified object of interest, wherein an increase in a ratio of the one or more devices focused on the object of interest over a period of time indicates an increased level of interest and a decrease in the ratio indicates a decrease in level of interest;

determining the state of a cluster using the received stream of data, wherein the determination comprises calculating the number of users of the one or more electronic devices in the cluster from the data stream after the particular object of interest is identified; and transmitting instructions from the computer system to the electronic devices to alter the image of the object displayed on the electronic devices.

12. The non-transient computer-readable medium of claim 11, wherein the instructions when executed by the computer system further cause the computer system to perform operations comprising:

causing the image of the object of interest to be altered in a manner that is proportional to the dynamic state of the cluster.

13. The non-transient computer-readable medium of claim 12, wherein the instructions when executed by the computer system further cause the computer system to perform operations comprising:

causing the color hue, tint, tone, or shade of the displayed object of interest to be altered in relation to the dynamic state of the cluster.

14. The non-transient computer readable medium of claim 11, wherein the instructions when executed by the computer system further cause the computer system to perform operations comprising:

communicating queries to the electronic devices relating to the object of interest; and receiving responses communicated from the electronic devices, wherein the image of the object of interest is altered in a manner relating to the responses received from the electronic devices.

15. The non-transient computer-readable medium of claim 14, wherein the instructions when executed by the computer system further cause the computer system to perform operations comprising:

providing rewards to users of the electronic devices for received responses by communicating discounts for products related to the object of interest to the electronic devices.

* * * * *